Figure 1:
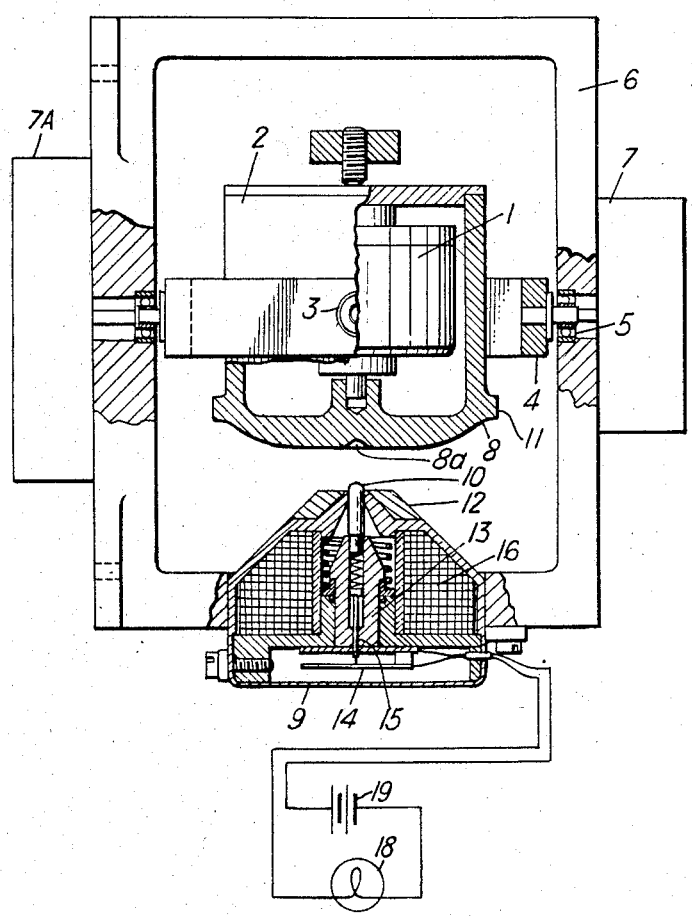

United States Patent Office 2,884,787
Patented May 5, 1959

2,884,787
GYROSCOPE CAGING DEVICES

William R. Simons, Cheltenham, England, assignor to Smiths America Corporation, Washington, D.C.

Application December 19, 1955, Serial No. 554,025

2 Claims. (Cl. 74—5.1)

The present invention relates to caging devices for gyroscopes having two precessional degrees of freedom.

The function of such a caging device is to bring the usual inner gimbal ring (or its equivalent, for example a rotor casing) into a predetermined position relative to the other gimbal ring (usually one of orthogonality) and to bring the outer gimbal ring into a predetermined position relative to the structure to which it is (pivotally) attached.

It is the object of the present invention to provide a caging device which is simple and may be made relatively compact.

According to the present invention a caging device for a gyroscope comprises a member forming part of or being attached to the inner gimbal ring, said member being formed with an inwardly-directed conical depression, and a plunger, said plunger being normally spaced away from the inner gimbal ring but being adapted to be forced into contact with the said depression, the inner and outer rings being located in the desired predetermined positions when the plunger is at the vertex of the depression.

It will be appreciated by those skilled in the art that the line of action of the plunger must make an angle with the tangent to the depression at the point of contact between it and the plunger which is less than 90° minus the angle of friction at the point of contact. However, preferably the shape of the depression is such that this angle is always only slightly less than 90° minus the angle of friction. This ensures that the depth of the depression required for satisfactory operation is kept relatively small.

Preferably the depression forms part of a surface formed by the revolution of a portion of a curve about the line of action of the plunger when it reaches the vertex of the depression; and it will be appreciated that the ideal form for this curve would be that of a portion of an equiangular spiral described about the intersection of the two gimbal axes of the gyroscope. In most practical cases, where the gyroscope is only required to be moved through a maximum angle of up to about 45° during caging, a sufficiently good approximation to the ideal form may be provided by the arc of a circle, described about a centre suitable offset from the intersection of the gimbal axes.

A gyroscope having two precessional degrees of freedom and provided with a caging device in accordance with the invention will now be described.

With reference to the accompanying drawing, which shows the gyroscope and caging mechanism partially in section and also a warning circuit associated with the caging mechanism.

An electrically-driven rotor 1 is carried within a hollow cylindrical casing 2 which constitutes the inner gimbal. Casing 2 is pivotally mounted by means of bearings 3 in an outer gimbal ring 4, this latter being mounted by means of bearings such as 5 in a supporting frame 6. Conventional pick-off devices and torque motors are provided, those carried on the frame 6 being indicated at 7 and 7a respectively.

One end of the rotor casing 2 is provided with a cam surface 8 in the form of the surface of a solid of revolution described about the spin axis of rotor 1. The contour of the cam approximates to a curve of the form $$r = c \exp m\theta$$

in the usual notation, the pole of the curve being at the intersection of the gimbal axes and the spin axis and $c$ and $m$ being constants. A part spherical depression 8a is formed at the centre of surface 8.

A solenoid 9 is mounted upon frame 6 and, upon energisation, operates a plunger 10 having a hemispherical tip which may engage with cam surface 8, eventually seating in depression 8a and the line of action of the plunger 10 coinciding with the spin axis of rotor 1. The constant "$m$" in the expression for the cam surface given earlier is rather greater than the co-efficient of friction between the plunger tip and the cam surface. This implies that the angle between the tangent to the cam surface 8 and the line of action of the plunger 10 at their point of contact is less than 90° minus the angle of friction for the contact, so that the cam surface 8 can slide past the tip of the plunger. The cam surface can in practice be defined by the rotation of the arc of a circle described about a centre suitably offset from the pole of the spiral.

The solenoid plunger 10 is carried by a spring-loaded soft iron armature 13 disposed in a bore in the solenoid surrounded by an exciting coil 16. Energisation of the coil results in the protrusion of plunger 10. A lightly spring-loaded plunger 15 is carried in a bore in armature 13. This when the solenoid is de-energised opens contacts 14 arranged in the circuit of a battery 19 and warning lamp 18, the contacts 14 being closed when the solenoid is energised and the plunger 10 is seated in depression 8a.

Movement of the gyroscope from its datum or caged position, in which the rotor spin axis is aligned with that of plunger 10 and the spin axes and the gimbal axes are mutually orthogonal, is limited by a conical stop 12 surrounding plunger 10 in conjunction with a curb ring 11 surrounding cam surface 8. Curb ring 11 may be circular in form, centered on the spin axis, or it may be square, its sides being parallel with the gimbal axes.

In operation, to cage the gyroscope winding 16 is energised. The tip of plunger 10 then engages cam surface 8. If the rotor is not spinning the tip of plunger 10 describes a radial path on cam surface 8, eventually seating in depression 8a. If the rotor is spinning it describes a spiral path as the gyroscope precesses, eventually again seating in depression 8a. Just before plunger 10 attains the bottom of depression 8a contacts 14 are closed, indicating that the gyroscope is caged. Upon de-energisation of winding 16 the gyroscope is uncaged practically instantaneously.

I claim:

1. A caging device for a gyroscope having a rotor mounted in an inner gimbal ring gimballed in a pivotally mounted outer gimbal ring comprising a cam member on the inner gimbal ring, and a plunger, said plunger being normally spaced away from the inner gimbal ring but being adapted to be forced into contact with the cam member, the said cam member being formed with an inwardly directed depression and having a contour forming part of a surface formed by the revolution of a portion of a curve about the line of action of the plunger when it reaches the vertex of the depression such that the angle between the tangent to the cam member surface at its point of contact with the plunger and the line of action of the plunger is always slightly less than 90° minus the angle of friction, engagement of the plunger with the surface thus resulting in seating of the plunger in the vertex of the depression, the gyroscope then being in the caged condition, and said cam member surface being bounded by a curb ring co-operating with a stop surrounding the plunger to limit movement of the gyroscope from the caged position.

2. A caging device as claimed in claim 1 wherein warning means are associated with the plunger to indicate when the gyroscope is in a caged condition.

References Cited in the file of this patent

UNITED STATES PATENTS

| | | |
|---|---|---|
| 1,522,924 | Sperry | Jan. 13, 1925 |
| 2,105,148 | Inglis | Jan. 11, 1938 |
| 2,369,845 | Noxon | Feb. 20, 1945 |
| 2,556,253 | Blair et al. | June 12, 1951 |
| 2,654,254 | Wendt | Oct. 6, 1953 |

FOREIGN PATENTS

| | | |
|---|---|---|
| 109,727 | Sweden | Feb. 8, 1944 |